April 23, 1963    D. ENGELSMANN ETAL    3,086,437
AUTOMATIC EXPOSURE CONTROLLING STRUCTURE FOR CAMERAS
Filed Sept. 14, 1961    3 Sheets-Sheet 1
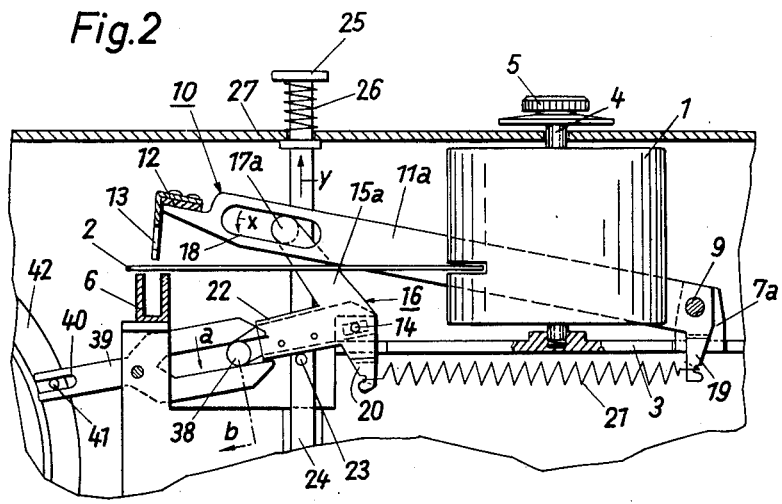
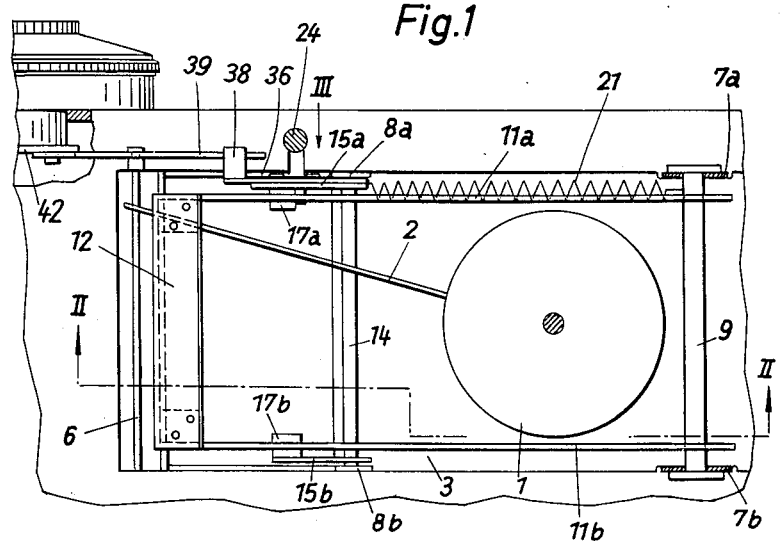
*INVENTOR.*
*DIETER ENGELSMANN*
BY  *HUBERT HACKENBERG*

April 23, 1963     D. ENGELSMANN ETAL     3,086,437
AUTOMATIC EXPOSURE CONTROLLING STRUCTURE FOR CAMERAS
Filed Sept. 14, 1961     3 Sheets-Sheet 2

*INVENTOR.*
*DIETER ENGELSMANN*
BY    *HUBERT HACKENBERG*

April 23, 1963   D. ENGELSMANN ETAL   3,086,437
AUTOMATIC EXPOSURE CONTROLLING STRUCTURE FOR CAMERAS
Filed Sept. 14, 1961                                   3 Sheets-Sheet 3

INVENTOR.
DIETER ENGELSMANN
BY   HUBERT HACKENBERG
Michael S. Striker
Attorney

United States Patent Office 3,086,437
Patented Apr. 23, 1963

3,086,437
AUTOMATIC EXPOSURE-CONTROLLING
STRUCTURE FOR CAMERAS
Dieter Engelsmann, Unterhaching, near Munich, and
Hubert Hackenberg, Munich, Germany, assignors to
Agfa Aktiengesellschaft in Leverkusen-Bayerwerk,
Munich, Germany
Filed Sept. 14, 1961, Ser. No. 138,060
Claims priority, application Germany Sept. 22, 1960
23 Claims. (Cl. 95—10)

The present invention relates to cameras.

More particularly, the present invention relates to cameras which are at least partly automatic in that a suitable structure automatically sets part of the camera structure which determines the exposure made by the camera. This latter structure which determines the exposure made by the camera may be the structure for setting the exposure time of the camera or the structure for setting the exposure aperture of the camera, and such a structure may be automatically set in the cameras to which the present invention relates.

With this particular type of camera there are several problems. For example, it is conventional to provide in such cameras a scanning structure which scans the position of an element such as a pointer of a light meter, and of course a suitable transmission will set an element such as the diaphragm or exposure time structure of the camera in accordance with the movement of the scanning means. Such cameras necessarily require a spring which will urge the scanning means to the position where it engages the pointer of the light meter, and this spring also serves to actuate the transmission which sets the camera, at least in part, in accordance with the lighting conditions. In addition, the scanning and transmission structure must be maintained in a predetermined rest position, and there is a manually operable structure which the operator actuates in order to release the scanning structure and the transmission structure to the spring. This manually operable release structure must be releasably maintained in a given rest position by a return spring which of course must be stronger than the spring which actuates the scanning structure and the transmission structure. In fact, when the manually releasable structure is in its rest position, the return spring is expanded and exerts its weakest force, and precisely at this time the driving spring which drives the scanning structure and the transmission structure is tensioned so as to be under its maximum stress. Therefore, the return spring, when it exerts its weakest force, must be stronger than the strongest force of the driving spring, and this return spring must therefore be a particularly powerful spring, especially in the case where the manually operable release structure is also used for the shutter of the camera. Because of this relatively large force which is required for the return spring, the operator when actuating the manually operable release structure is required to exert a considerable force in order to overcome the force of the return spring, and the result is that it is difficult for the operator to hold the camera steady so as to make a proper exposure.

An additional problem encountered with cameras of this type is the problem of space. On certain types of cameras there is very little space available for the structure which will automatically set the camera, at least in part. For example, in modern single lens reflex cameras, the entire central portion of the upper part of the camera is full occupied by the viewfinder structure which in this particular type of camera may take the form a pentaprism. As a result there remains at the upper part of the camera on opposite sides of the viewfinder structure an extremely limited space, and it is necessary with cameras of this type, particularly, to locate the automatic structure in one of these very limited spaces on one side of the viewfinder structure. This extremely limited space which is available also creates a particular problem with this type of automatic camera.

One of the objects of the present invention is to provide a camera of the type referred to above in which the return spring can be made substantially weaker than conventional return springs so that the above-discussed likelihood of unsteadiness in the camera can be reliably avoided.

A further object of the present invention is to provide for a camera of the above type an exceedingly compact assembly which is capable of automatically setting the camera at least in part.

An additional object of the present invention is to provide in a camera of the above type an automatic assembly which while being extremely compact nevertheless operates with extremely high accuracy, so that the accuracy of operation is in no way detracted from because of the compactness of the assembly.

It is furthermore an object of the present invention to provide structure capable of accomplishing the above objects while at the same time composed of simple inexpensive elements which at the same time are very reliable in operation.

With these objects in view the invention includes, in a camera, a combined scanning means and transmission means capable on the one hand of scanning the position of an element such as the pointer of a light meter and on the other hand of transmitting movement of the scanning means to a structure of the camera which, at least in part, determines the exposure made by the camera, this structure of the camera being, for example, the diaphragm setting structure or the exposure time setting structure of the camera, or both. A spring means is provided for urging the combined scanning and transmission means from a predetermined rest position, and in accordance with the present invention a connecting means connects this spring means to the combined scanning and transmission means for urging the latter means from its rest position while at the same time maintaining the spring means at all times in a floating condition supported between a pair of elements which move at all times in the same direction. Therefore, the return spring of the camera which returns the parts to their rest position need not be as strong as in the case where the driving spring means is fixed at one end to a stationary element. In addition, with the structure of the invention, the combined scanning and transmission means includes a substantially U-shaped lever having a pair of opposed parallel spaced arms and a third arm extending between and carried by this pair of parallel arms, and the light meter is located in the space between the pair of arms of the U-shaped member while the scanning means is carried by the third arm thereof, so that in this way an extremely compact assembly is provided.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a fragmentary, partly sectional, top plan view of one possible embodiment of a structure according to the present invention;

FIG. 2 is a fragmentary sectional elevation taken along line II—II of FIG. 1 in the direction of the arrows;

Figure 3:
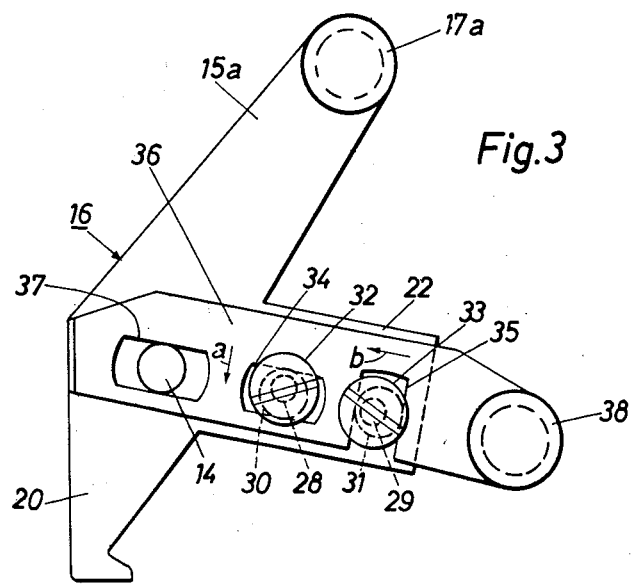
FIG. 3 is an enlarged side elevation of a detailed part of the structure of the invention, FIG. 3 showing the structure as seen in the direction of the arrow III of FIG. 1.

Referring now to FIGS. 1 and 2, there is shown therein a light meter 1 which includes a movable indicating element in the form of a pointer 2. This meter 1 is supported for rotary movement about its axis on a bearing of a stationary plate 3. In a well known manner the meter is actuated by any photosensitive structure such as a photocell which is exposed to the light or by an electrical resistor which is light sensitive and which is included with a battery in a circuit with the light meter. In order to set into the camera the influence of the speed of the film which is used therein, a shaft 4 is fixed coaxially to the meter 1 and extends through the upper wall 27 of the upper part of the camera to the exterior thereof where this shaft 4 is fixed to a knob 5, so the operator may turn the knob 5 and thus the shaft 4 and the meter 1 to angular positions in accordance with the speed of the film which is used in the camera. For this purpose, the knob 5 may carry an index which cooperates with a suitable scale of film speeds on top of the camera, or the knob 5 may itself carry scale of film speeds and cooperate with an index on top of the camera adjacent the knob 5. The free end portion of the indicating element or pointer 2 of the meter 1 moves over a support member 6 in the form of an elongated rigid channel member of substantially U-shaped cross section, as shown in FIG. 2, and this member 6 is stationary.

The plate 3 fixedly carries at opposed side edges a pair of upstanding aligned lugs 7a and 7b, as well as a second pair of upstanding aligned lugs 8a and 8b. The lugs 7a and 7b are respectively formed with aligned bores which receive the ends of a rod 9 which forms a pivot means, and a substantially U-shaped member 10 has a pair of spaced parallel aligned arms 11a and 11b respectively formed with openings through which the rod 9 extends, so that in this way the member 10 is supported for turning movement about the axis of the rod 9. The arms or levers 11a and 11b may be fixed to the rod 9 to turn therewith, and in this case the rod 9 is supported for turning movement by the lugs 7a and 7b, or the rod 9 may be fixed to the lugs 7a and 7b and the arms or levers 11a and 11b are turnable with respect to the rod 9. In either case the rod 9 forms a pivot means supporting the levers 11a and 11b for turning movement about the axis of the pivot means 9. The third arm 12 of the U-shaped member 10 extends between and is fixed to the ends of the levers 11a and 11b which are distant from the pivot means 9. It will be noted that meter 1 is located in the space between the arms 11a and 11b. A scanning means 13 is carried by the third arm 12 of the U-shaped member 10, and this scanning means 13 is simply in the form of an angle member fixed to the arm 12 and having a downwardly extending wall formed with a cutout the edge of which is suitably curved so as to form a scanning edge adapted to cooperate with the pointer 2 when the scanning means 13 moves downwardly from the position indicated in FIG. 2. Of course, during scanning the scanning means 13 will simply move freely into the member 6 which will support the pointer 2 when it is engaged by the scanning edge so as to be deflected slightly in a downward direction into engagement with the upper parallel edges of the support member 6.

The lugs 8a and 8b are also formed with aligned bores, and these bores receive the ends of a shaft 14 which is supported for turning movement about its axis by the lugs 8a and 8b, and the rod 14 fixedly carries a pair of additional levers 15a and 15b which are respectively located alongside of the levers 11a and 11b. Because the levers 15a and 15b are fixed to the rod 14, which forms a pivot means for these levers, the entire assembly 14, 15a and 15b forms a transmission unit 16 which cooperates with the lever means 10 in a manner described below. Thus, a means is provided for connecting the levers 15a and 15b respectively to the levers 11a and 11b so that all of these levers will simultaneously turn in the same directions about the parallel axes of the pair of pivot means 9 and 14, and this connecting means takes the form of a pin-and-slot connection formed by the slots 18 which are formed in the levers 11a and 11b and the pins 17a and 17b which are respectively fixed to the levers 15a and 15b and which are respectively located in and slidable along the slots 18, as is most clearly apparent from FIG. 2. Therefore the connecting means formed by the pin-and-slot connections 17a, 18 and 17b, 18 interconnects the pair of levers 15a and 15b respectively with the pair of levers 11a and 11b so that these levers are all constrained to turn simultaneously in the same directions about the parallel spaced axes of the pair of pivot means 9 and 14, and it will be noted that the levers 11a and 11b are respectively of a substantially longer length than the levers 15a and 15b. Actually the levers 15a and 15b respectively have approximately one-third of the length of the levers 11a and 11b.

A spring means 21 is provided for urging all of these levers to turn simultaneously in the same directions about the pair of parallel pivot axes from the rest position shown in FIG. 2, and this direction of turning is indicated by the arrow x in FIG. 2. A connecting means is provided for connecting the spring means 21 to these levers not only for urging them to turn from the rest position shown in FIG. 2 in the direction of the arrow x, but also to maintain the spring 21 at all times in a floating, tensioned condition supported between a pair of elements both of which move in the same direction. This connecting means is formed by a pair of arms 19 and 20 of the pair of levers 11a and 15a, respectively, so that these arms 19 and 20 make a pair of portions of the connecting means for connecting the spring means 21 to the levers 11a and 15a. It will be noted that the arms 19 and 20 are substantially parallel to each other and extend in the same directions from the pivots 9 and 14, respectively, so that during turning of the levers 11a and 15a simultaneously in the same direction the substantially parallel arms 19 and 20 also turn in the same direction, and in this way during turning of the entire transmission means formed by these levers the length of the spring 21, and therefore its tension, will change to an extent substantially less than if one end of the spring were connected to a stationary element. The spring 21 is simply stretched between, for example, and hooked on to the pair of connecting portions 19 and 20 which connect the spring means 21 to the pair of levers 11a and 15a.

The lever 15a of the assembly 16 is one arm of a bellcrank lever, the other arm of this bell crank being shown at 22 in FIG. 2. The lower edge of the arm 22 is engaged by a pin 23 of a manually operable release means which includes the vertically movable rod 24 which carries the pin 23. The rod 24 extends upwardly through the wall 27 to the exterior of the camera, and at its top end the rod 24 is a knob 25 which is engaged at its underside by the top end of a coil spring 26 coiled around the rod 24 at its portion which extends about the wall 27. The bottom end of the coil spring 26 engages the upper face of the wall 27, and a collar fixedly carried by the rod 24 limits its movement upwardly in the direction indicated in FIG. 2 by the arrow y. Thus, the spring 26 forms the return spring of the manually operable release means, and it is the force of this spring 26 that the operator must overcome in order to depress the rod 24 so as to release the structure which will automatically set the camera, at least in part, according to the lighting conditions. The spring 26 must of course be stronger than the spring 21 in order to maintain the parts in the rest position as shown in FIG. 2 in opposition to the spring 21, and of course when the operator depresses the rod 24 the spring 21 will turn the transmission means 10, 16 in the direction of the arrow *x* shown in FIG. 2.

The transmission from the arm 22 to the structure of the camera which determines, at least in part, the exposure made thereby, is adjustable and includes a plate 36 which is located alongside of the arm 22, as shown most clearly in FIG. 3. An adjusting means adjustably connects the plate 36 to the arm 22. For this purpose a pair of rotary members 28 and 29 are turnably connected to the arm 22. These rotary members 28 and 29 may be in the form of rivets which have a fairly tight fit in openings of the arm 22 so that these rotary members can only be turned with the application of a certain substantial force and at the same time will, because of their frictional engagement with the arm 22, remain in the positions to which they are turned. The adjusting means further includes portions of the plate 36 which are respectively formed with the elongated cutouts 34 and 35 which extend in mutually perpendicular directions, as is shown most clearly in FIG. 3, and it will be noted that the plate 36 also is formed with an elongated cutout 37 which receives a part of the rod 14. The rotary members 28 and 29 respectively carry, within the cutouts 34 and 35, eccentrics 30 and 31, so that by turning the rotary members 28 and 29 these eccentrics by engaging the plate 36 in its cutouts 34 and 35 can adjust the position of the plate 36 with respect to the arm 22. In order to turn the rotary members 28 and 29, they carry slotted heads 32 and 33, respectively, so that the rotary members may be easily turned with a screwdriver, and of course these heads 32 and 33 extend beyond the cutouts 34 and 35 so that they retain the plate 36 connected to the arm 22. Thus, by turning the rotary member 28 the plate 36 can be adjusted with respect to the arm 22 in the direction of the arrow *a* shown in FIG. 3 while by turning the rotary member 29 the plate 36 can be adjusted in the direction of the arrow *b* shown in FIG. 3, so that in this way it is possible to adjust the plate 36 in a pair of mutually perpendicular directions with respect to the arm 22. The plate 36 carries at an end portion which extends beyond the arm 22 a pin 38 which is located in a bifurcated portion of the lever 39 which is supported for turning movement about a stationary axis, and which has its end distant from the pin 38 a notch 40 which receives a pin 41 fixed to a rotary ring 42 which may, for example, be the part of the camera which adjusts the exposure aperture, the exposure time, or both. Instead of the illustrated arrangement where pin 38 is received in a cutout of the lever 39 so that the arm 22 and the lever 39 are always constrained to turn at the same time although in opposite directions, it is possible to have the pin 38 simply resting against a side edge of the arm 39, and in this case a return spring associated with the element 42 of the camera would operate through the arm 39 to maintain a side edge in engagement with the pin 38.

In order to provide for accurate setting of the camera structure 42 in accordance with the positions of the pointer 2 of the light meter, the rotary member 28 is turned so that the eccentric 30 moves the plate 36 in the direction of the arrow *a*, or in the opposite direction, and thus it is possible to regulate the position which the structure 42 has for a given position of the pointer 2. This adjustment may advantageously be made for an end position of the structure 42. If it is found that in further positions of the structure 42 there are inaccuracies between the adjustments provided by the structure 42 and the lighting conditions, then the operator turns the rotary member 29 so as to provide adjustment in the direction of the arrow *b* or in the opposite direction. In this way it is possible to provide for a given angle of turning of the transmission assembly 16 a selected angle of turning of the camera setting structure 42, and it is possible to provide the greatest accuracy in the automatic setting of the camera.

In order to operate the structure shown in FIGS. 1 to 3 and described above, the operator depresses the knob 25 and of course the rod 24 therewith in the direction opposite to that indicated by the arrow *y* in FIG. 2, and of course in opposition to the spring 26. Thus, the pin 23 moves downwardly, as viewed in FIG. 2. The driving spring 21 is now free to turn the transmission means 10, 16 in the direction of the arrow *x*, and of course at this time the scanning means 13 will scan the position of the pointer 2, which is the indicating element of the meter means 1. Of course, the scanning means 13 by its cooperation with the pointer 2 will limit the extent of turning of the transmission means 10, 16 by the spring 21 in the direction of the arrow *x*, and thus this transmission means will stop turning when the scanning means 13 engages the pointer 2 so that the extent of turning of the transmission 10, 16 from its rest position shown in FIG. 2 will be in accordance with the lighting conditions. When the scanning means 13 engages the pointer 2, it is deflected slightly into engagement with the support 6 which of course reinforces and supports the pointer 2 and prevents transmission of undesirable vibrations back into the meter 1. It will be noted that with this construction during the turning of the transmission means 10, 16 in the direction of the arrow *x*, the length of the spring 21 changes substantially less than it would if one end were stationary, and it will be seen that this result was brought about by the turning of the transmission assemblies 10 and 16 in the same directions. Thus, during the entire operation the force exerted by the spring 21 also remains substantially less than if one end of the spring were fixed. The turning of the transmission means of course acts through the pin 38 on the lever 39 so as to set the camera through the camera setting structure 42.

Upon manual release of the rod 24, the return spring 26, which is stronger than the spring 21, returns the parts to the position shown in FIG. 2, and during this return movement the transmission means operates through the pin 38 and the lever 39 on the structure 42 to return this latter structure also to its starting position.

Thus, with the structure of the invention it is only necessary for the spring 21 to exert, at all times, a force which corresponds to the minimum force which must be exerted by a conventional spring which has one end fixed to a stationary part of the camera and which has its other end fixed to the transmission so as to move the transmission. As a result, the spring 26 need only be strong enough to overcome this minimum force of a conventional spring, and there is thus a considerable reduction in the force of the spring 26 since it is not necessary to make this spring stronger than the strongest force of a conventional driving spring, as is required in conventional cameras. The saving or extent by which the force of the spring 26 may be reduced corresponds to the difference between the maximum and minimum forces exerted by a conventional driving spring, and the force of the spring 26 may be reduced to the extent of this difference, so that the spring 26 is much weaker than a conventional return spring. A further highly significant advantage provided by the structure of the invention resides in the fact that the scanning means 13 will at all times exert a substantially smaller force on the pointer 2, irrespective of the position of the pointer, than in the case of an assembly where the driving spring has one end which remains stationary. Thus, with a conventional construction where the driving spring, which corresponds to the spring 21, is fixed at one end to a stationary part of the camera and at its other end to the structure which moves the scanning means, it is evident that if the position of the pointer of the light meter is such that the scanning means moves through only a relatively small distance from its rest position, then the driving spring exerts a considerable force and the scanning means of course engages the pointer of the light meter with a considerable force, while if the position of the pointer of the light meter is such that the scanning means turns through a relatively large distance, then the conventional driving spring will of course have its force reduced considerably before the scanning means engages the pointer, so that under these conditions, which prevail in conventional constructions, the force with which the scanning means engages the pointer varies with the position of the pointer, and thus a variable force is transmitted through the pointer to the light meter. However, with the structure of the invention, the spring 21 is under less tension and has a smaller variation in tension than in the case of a conventional construction, so that irrespective of the position of the pointer 2, the scanning means will always engage the pointer 2 with substantially less force than the scanning means of a conventional assembly, so that the entire structure is subject to considerably less stress than a conventional construction.

Figure 4:
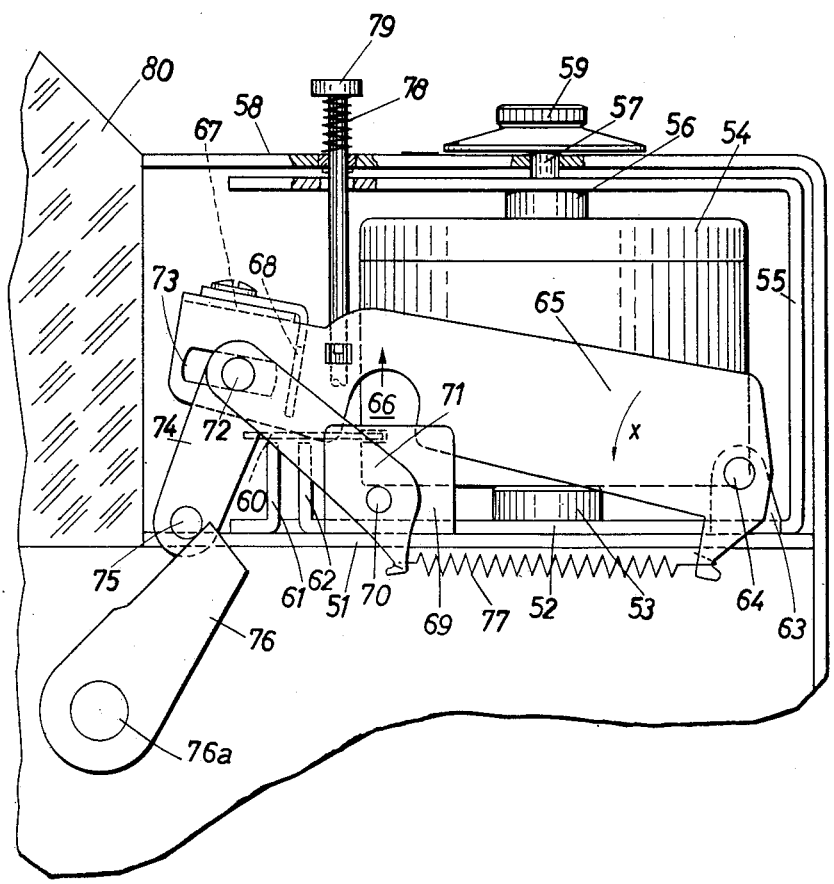
FIG. 4 is a fragmentary elevation, in a plane normal to the optical axis, showing another embodiment of a structure according to the present invention.

The structure which is shown in FIGS. 1–3 lends itself to the provision of an exceedingly compact assembly, and this characteristic of the structure of the invention is demonstrated by the embodiment illustrated in FIG. 4. Referring now to FIG. 4, it will be seen that the upper wall 51 of the camera housing fixedly carries a plate 52 which corresponds to the plate 3 of FIGS. 1–3 and which carries a bearing 53 for the rotary light meter 54. This plate 52 has, at its right end, as viewed in FIG. 4, an upwardly extending arm 55 which in turn is connected to a horizontal arm of the plate 52, and this upper horizontal arm carries a further bearing 56 for the light meter 54, the bearings 53 and 56 being coaxial and of course these bearings are coaxial with the axis of the meter 54. In order to set the angular position of the meter 54 in accordance with the speed of the film which is used in the camera, a shaft 57 is fixed to the meter 54 coaxially therewith and extends through the upper wall 58 of the cap of the camera which extends above the housing thereof, and at this upper wall 58 the shaft 57 is fixed to a knob 59 provided with an index cooperating with a suitable scale of film speeds, as described above in connection with FIGS. 1–3, so that in this way it is possible for the operator, by turning the knob 59, to set the light meter 54 at an angular position corresponding to the particular speed of the film which is used in the camera.

The light meter 54 includes a movable indicating element 60 in the form of a pointer which will assume, in the manner described above, in connection with FIGS. 1–3, a position indicative of the lighting conditions. The pointer 60 is capable of moving freely over a pair of upstanding portions 61 and 62 of the plate 52, so that these portions 61 and 62 perform the same function as the element 6 described above. When the pointer 60 is engaged by the scanning means this pointer 60 will be deflected only through a very slight distance into engagement with the upper edges of the upstanding portions 61 and 62 of the plate 52, so that in this way the light meter is protected.

At the side of the light meter 54 which is opposite from its pointer 60, the plate 52 has at its opposed side edges, respectively, a pair of upstanding lugs 63, and these lugs 63 are aligned with each other and are formed with aligned bores respectively receiving the end portions of a pivot means 64 in the form of an elongated rod similar to the rod 9 of FIGS. 1–3. A substantially U-shaped transmission member 66 has a pair of opposed parallel arms 65 which are aligned with each other and which are identical, and these spaced parallel arms 65 are formed with bores receiving the ends of the pivot means 64. The pivot means 64 may be fixedly carried by the lugs 63 and may turnably support the U-shaped member 66, or the arms 65 of the U-shaped member 66 may be fixed to the rod 64 which in this case is supported for turning movement about its axis by the lugs 63. Thus, the axis of the rod 64 forms the axis of turning of the U-shaped member 66 which of course corresponds to the member 10 of FIGS. 1–3. The pair of spaced parallel arms 65 of the U-shaped member 66 are fixed, at their ends distant from the pivot means 64, to the ends of a third arm 67 of the U-shaped member 66, this third arm 67 of course extending between and being fixed to the arms 65, and it will be noted that the light meter 54 is located in the space between the spaced parallel arms 65 and furthermore that the third arm 67 of the member 66 is located closely adjacent to the light meter 54, so that an extremely compact assembly is provided. This third arm 67 of the U-shaped member 66 fixedly carries the scanning means 68 which again is in the form of an angle member whose downwardly directed wall is formed with a cutout having a scanning edge of suitable configuration adapted to cooperate with the pointer 60, and of course during scanning, this downwardly directed wall of the angle member will extend freely into the space between the upstanding portions 61 and 62 of the plates 52.

The plate 52 is provided with an additional pair of aligned lugs 69 respectively located at its opposite side edges, and these upstanding lugs 69 are respectively formed wtih aligned openings receiving the end portions of a rod 70 which forms the second pivot means the axis of which is of course parallel to and spaced from the axis of the pivot means 64. A pair of additional levers 71 are respectively fixed to the ends of the rod 70 so as to turn therewith, and these levers 71 respectively carry pins 72 which respectively extend into elongated slots 73 formed in the arms 65 at their end portion distant from the pivot means 64, so that with the embodiment of FIG. 4 there is also provided a connecting means formed by this pin-and-slot connection interconnecting the lever means 70, 71 with the lever means 66 so as to constrain both of these lever means to return about their parallel turning axes, respectively, at all times in the same directions. It is to be noted that here also the arms 65 are substantially longer than the arms 71. The arm 71 which is visible in FIG. 4 forms an arm of a bell crank whose other arm 74 carries a pin 75 engaging the upper edge of a lever 76 which is fixed to a rotary rod 76a which during turning will in a known way set either the exposure time, or the exposure aperture, or both, this rod 76a supported by any suitable bearings for rotary movement about its axis and of course an unillustrated return spring urges the rod 76a and the lever 76 therewith to turn in a counterclockwise direction, as viewed in FIG. 4, so as to maintain the upper edge of the lever 76 in engagement with the pin 75. The parts are shown in FIG. 4 in a rest position where the camera adjusting structure 76a is in one of its end positions. The force of the spring which urges the elements 76 and 76a to the position shown in FIG. 4 is opposed by the force of a stronger spring 77 which is, of course, a driving spring corresponding to the spring 21 described above. It will be noted that the spring means 77 is connected to the levers 65 and 71 by a connecting means which includes a pair of substantially parallel arms of these levers extending respectively in the same directions from the pivots 70 and 64, and the spring 77 is stretched between and hooked onto these arms, so that the results described above in connection with the spring 21 will be produced also by the spring 77. When the structure is released to the spring 77, this spring drives the levers around their pivot axes in the direction of the arrow x shown in FIG. 4.

The embodiment of FIG. 4 includes a manually operable release means corresponding to that of FIG. 2. Thus, it may be seen from FIG. 4, an elongated rod extends through aligned openings of the wall 58 and the upper part of the plate 52, and the release rod carries a pin engaging the underside of a lug extending laterally from the arm 65. At the part of the release rod which extends above the wall 58, there is a coil spring 78 which is coiled about this part of the rod and which engages the underside of the manually-engageable knob 79 which is carried by the release rod and which also engages the upper face of the top wall 58, so that this spring 78 forms a return spring corresponding to the spring 26 described above. The release rod of FIG. 4 also carries a collar which limits the upward movement of this rod, and this collar may engage the underside of the upper part of the plate 52, or if the opening of this upper part of the plate 52 is made large enough the collar may pass through this opening so as to engage the underside of the wall 58 in order to limit the upward movement of the manually operable release rod, and of course in this way the rest position of the parts is determined. When the operator depresses the knob 79, the transmission means 66, 71 is released to the spring means 77 which now turns all of the levers in the direction of the arrow $x$ shown in FIG. 4, and of course at this time the arm 24 will move downwardly so as to turn the lever 76 and the rod 76a in a clockwise direction, as viewed in FIG. 4, so that in this way the camera is, at least partly, set in accordance with the lighting conditions, the scanning means 68 by its cooperation with the pointer 60 limiting the extent of turning of the levers by the spring means 77.

It is thus apparent that the structure of the invention may be located within an extremely small space located within the cap, on the top wall of the housing of the camera on one side of the viewfinder structure thereof shown diagrammatically at 80 in FIG. 4.

The levers 71 also perform the function of reinforcing the levers 65 and preventing any twisting or deformation thereof, so that the entire U-shaped member 66 may be stamped from a relatively thin metal. The reinforcing function of the levers 71 is of course enhanced by the fixed connection to the pivot means 70, so that the pair of levers 71 and the pivot pin or rod 70 form a single rigid unit reinforcing the U-shaped member 66 so as to prevent any twisting or the like of the member 66 which might result in inaccuracies.

It will be understood that each of the elements described above or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera, in combination, setting means for setting at least part of the structure of the camera which determines the exposure made thereby; meter means having an indicating element capable of assuming positions indicative of the lighting conditions; scanning means for scanning said indicating element of said meter means so that the position of said scanning means will also be indicative of the lighting conditions; transmission means cooperating with setting means for transmitting movement of said scanning means to said setting means so that the latter will set said camera structure according to the lighting conditions, said scanning means and transmission means forming a unitary assembly; manually operable release means cooperating with said assembly for releasing the latter for operation so that said scanning means will scan said indicating element of said meter means and said transmission means will transmit the movement of said scanning means to said setting means; first spring means cooperating with said manually operable release means for urging the same to a predetermined rest position where said manually operable release means maintains said assembly in an inoperative position; second spring means for moving said assembly from said inoperative position thereof, upon actuation of said manually operable release means, in a direction where said scanning means will scan said indicating element and said transmission means will transmit movement of said scanning means to said setting means; and connecting means connecting said second spring means to said assembly for urging said assembly in said direction from said inoperative position thereof and for maintaining said second spring means at all times in a floating condition supported between elements which simultaneously move in the same direction during movement of said assembly, whereby said first spring means can have a much smaller force than if said second spring means were mounted between elements one of which was stationary.

2. In a camera, in combination, combined scanning and transmission means for scanning the position of an indicating element of a light meter and for actuating a structure of the camera which, at least in part, determines the exposure made by the camera; support means supporting said combined scanning and transmission means for movement from a rest position in a predetermined direction; spring means for urging said combined scanning and transmission means from said rest position thereof in said predetermined direction; and connecting means connecting said spring means to said combined scanning and transmission means while maintaining said spring means at all times in a floating condition supported between a pair of elements which move in the same direction during movement of said combined scanning and transmission means.

3. In a camera, in combination, combined scanning and transmission means for scanning the position of an indicating element of a light meter and for moving a structure of the camera which, at least in part, determines the exposure made by the camera; support means supporting said combined scanning and transmission means for movement from a predetermined rest position in a predetermined direction; spring means for urging said combined scanning and transmission means from said rest position thereof in said direction; and connecting means connecting said spring means to said combined scanning and transmission means and maintaining said spring means at all times in a floating condition tensioned between a pair of elements which move in the same direction during movement of said combined scanning and transmission means.

4. In a camera, in combination, a pair of parallel pivots having stationary pivot axes, respectively, and being spaced from each other; a pair of levers carried by said pivots, respectively, for turning movement about said axes, respectively, one of said levers being substantially longer than the other; first connecting means connecting said levers to each other for turning movement simultaneously in the same directions about said axes, respectively; scanning means for scanning the position of an indicating element of a light meter; spring means for turning said levers from a predetermined rest position simultaneously in the same directions about said axes, respectively, during scanning of said indicating element by said scanning means; second connecting means connecting said spring means to said levers for urging the same to turn from said predetermined rest position therefrom while maintaining said spring means at all times tensioned between a pair of portions of said levers which move in the same directions during turning of said levers; and motion-transmitting means operatively connected to at least one of said levers for transmitting movement thereof to a structure of the camera which, at least in part, determines the exposure which will be made by the camera.

5. In a camera, in combination, a pair of parallel pivots having stationary pivot axes, respectively, and being spaced from each other; a pair of levers carried by said pivots, respectively, for turning movement about said axes, respectively, one of said levers being substantially longer than the other; first connecting means connecting said levers to each other for turning movement simultaneously in the same directions about said axes, respectively; scanning means for scanning the position of an indicating element of a light meter; spring means for turning said levers from a predetermined rest position simultaneously in the same directions about said axes, respectively, during scanning of said indicating element by said scanning means; second connecting means connecting said spring means to said levers for urging the same to turn from said predetermined rest position thereof, said second connecting means including a pair of portions respectively fixed to said levers for turning movement therewith, said pair of portions respectively turning in the same directions, and said spring means being in the form of an elongated spring member stretched between and connected to said portions; and motion-transmitting means operatively connected to at least one of said levers for transmitting movement thereof to a structure of the camera, which, at least in part, determines the exposure which will be made by the camera.

6. In a camera, in combination, a pair of parallel pivots respectively having stationary pivot axes and being spaced from each other; a pair of levers respectively carried by said pivots for turning movement about said axes, respectively, one of said levers being substantially longer than the other; connecting means connecting said levers to each other for turning movements simultaneously in the same directions about said axes, respectively; spring means stretched between and connected to said levers for urging them to turn from a predetermined rest position simultaneously in the same directions about said axes, respectively, said spring means being connected to portions of said levers which move in the same directions, respectively; scanning means for scanning the position of an indicating element of a light meter during turning of said levers by said spring means from said rest position; and motion-transmitting means operatively connected to at least one of said levers for transmitting movement thereof to a structure of a camera which, at least in part, determines the exposure which will be made by the camera.

7. In a camera, in combination, a pair of parallel pivots respectively having stationary axes and being spaced from each other; a pair of levers respectively carried by said pivots for turning movement about said axes, respectively, one of said levers being substantially longer than the other; pin-and-slot means connecting said levers to each other for simultaneous turning movement in the same directions about said axes, respectively; spring means stretched between and connected to said levers for urging them to turn from a predetermined rest position in the same directions about said axes, said spring means being connected to portions of said levers which move in the same directions, respectively; scanning means for scanning the position of an indicating element of a light meter, said levers being turned by said spring means from said rest position having the time when said scanning means scans the position of said indicating elements; and motion-transmitting means operatively connected to at least one of said levers and transmitting movement thereof to a structure of a camera which, at least in part, determines the exposure made by the camera.

8. In a camera, in combination, a pair of parallel pivots respectively having stationary axes and spaced from each other; a pair of levers respectively carried by said pivots for turning movement about said axes, respectively, one of said levers being substantially longer than the other and said levers respectively having substantially parallel arms respectively extending in the same directions from said pivots; connecting means connecting said levers to each other for turning movement together in the same directions about said axes, respectively; an elongated spring stretched between and connected to said arms of said levers for urging said levers from a predetermined rest position in the same directions about said axes, respectively; scanning means for scanning the position of an indicating element of a light meter, said spring turning said levers in said same directions from said predetermined rest position thereof during scanning of said indicating element by said scanning means; and motion-transmitting means operatively connected to at least one of said levers and transmitting movement thereof to a structure of the camera which determines, at least in part, the exposure made by the camera.

9. In a camera, in combination, a pair of pivots respectively having stationary, parallel axes, said pivots being spaced from each other; an elongated lever and a short lever substantially shorter than said elongated lever respectively carried by said pivots for turning movement about said axes, respectively; connecting means connecting said levers to each other for simultaneous turning movement in the same directions about said axes, respectively; spring means for urging said levers to turn from a predetermined rest position about said axes; connecting means connecting said spring means to said levers for urging them to turn from said rest position thereof in the same directions about said axes, respectively, said connecting means for said spring means supporting the latter in a floating condition between portions of said levers which move in the same directions; scanning means carried by at least one of said levers for turning movement therewith, said means scanning the position of an indicating element of a light meter; and motion-transmitting means operatively connected to at least one of said levers for transmitting movement thereof to a structure of the camera which determines, at least in part, the exposure made by the camera.

10. In a camera, in combination, a bell-crank lever having one arm operatively connected to a structure of the camera which determines the exposure made by the camera so that said one arm of said bell crank lever will, during turning thereof, actuate said camera structure; first pivot means supporting said bell crank lever for turning movement about a predetermined axis; a second lever substantially longer than the other arm of said bell crank lever and having a pin-and-slot connection with said other arm of said bell crank lever; second pivot means supporting said second lever for turning movement about an axis parallel to the turning axis of said bell crank lever; spring means for urging said levers to turn respectively about said axes from a predetermined rest position so that said one arm of said bell crank lever will actuate said camera structure to determine, at least in part, an exposure made by the camera; scanning means for scanning the position of an indicating element of a light meter and cooperating with at least one of said levers for limiting the extent of turning thereof from said rest position in accordance with the lighting conditions; and connecting means connecting said spring means to said levers while maintaining said spring means at all times in a floating condition tensioned between portions of said levers which move in the same directions.

11. In a camera, in combination, a lever; pivot means supporting said lever for turning movement about a predetermined axis; scanning means for scanning the position of an indicating element of a light meter and cooperating with said lever for limiting the turning movement thereof from a predetermined rest position about said axis in accordance with the lighting conditions; a motion-transmitting plate located alongside at least a portion of said lever for turning movement therewith, said plate transmitting turning of said lever to a structure of a camera which determines, at least in part, the exposure made by the camera; and adjustable connecting means connecting said plate to said lever, said adjustable connecting means connecting said plate to said lever for adjustable movement with respect thereto in a pair of mutually perpendicular directions.

12. In a camera, in combination, a lever; a pivot means supporting said lever for turning movement about a predetermined axis; scanning means for scanning the position of an indicating element of a light meter and cooperating with said lever for limiting the turning movement thereof from a predetermined rest position about said axis in accordance with the lighting conditions; a motion-transmitting plate located alongside at least a portion of said lever for turning movement therewith, said plate transmitting turning of said lever to a structure of a camera which determines, at least in part, the exposure made by the camera; and adjustable connecting means connecting said plate to said lever, said adjustable connecting means connecting said plate to said lever for adjustable movement with respect thereto in a pair of mutually perpendicular directions, said adjustable connecting means including a pair of portions of said plate respectively formed with a pair of elongated, mutually perpendicular cutouts, a pair of rotary members turnably connected to said lever and extending through said cutouts, respectively, and a pair of eccentrics respectively connected to said rotary members for turning movement therewith and respectively engaging said plate in said cutouts thereof so that upon turning of said rotary members the eccentrics will cooperate with said plate to adjust the latter in a pair of mutually perpendicular directions with respect to said lever.

13. In a camera, in combination, lever means; pivot means for turning movement from a predetermined rest position; spring means for urging said lever means to turn from said rest position; connecting means connecting said spring means to said lever means for urging the latter from said rest position while maintaining said spring means at all times tensioned between elements which simultaneously move in the same directions; scanning means for scanning the position of an indicating element of the light meter and cooperating with said lever means for limiting the turning thereof from said rest position in accordance with the lighting conditions; adjustable motion transmitting means for transmitting movement of said lever means to a structure of the camera which determines the exposure made thereby, at least in part; and adjusting means operatively connected to said adjustable transmission means for adjusting the same.

14. In a camera, in combination, a substantially U-shaped member having a pair of spaced, parallel arms and a third arm extending between and connected to said pair of parallel arms; a light meter located between said arms of said U-shaped member and having a movable indicating element which assumes positions indicative of the lighting conditions; pivot means supporting said arms of said U-shaped member for turning movement about a predetermined axis; and scanning means carried by said U-shaped member for scanning the position of said indicating element of said light meter.

15. In a camera, in combination, a substantially U-shaped member having a pair of spaced, parallel arms and a third arm extending between and connected to said pair of parallel arms; a light meter located between said arms of said U-shaped member and having a movable indicating element which assumes positions indicative of the lighting conditions; pivot means supporting said arms of said U-shaped member for turning movement about a predetermined axis; and scanning means carried by said U-shaped member for scanning the position of said indicating element of said light meter, all of said arms of said U-shaped member being located closely adjacent to said light meter.

16. In a camera, in combination, a substantially U-shaped member having a pair of spaced, parallel arms and a third arm extending between and connected to said pair of parallel arms; a light meter located between said arms of said U-shaped member and having a movable indicating element which assumes positions indicative of the lighting conditions; pivot means supporting said arms of said U-shaped member for turning movement about a predetermined axis; and scanning means carried by said U-shaped member for scanning the position of said indicating element of said light meter, all of said arms of said U-shaped member being located closely adjacent to said light meter, and said pivot means also being located closely adjacent to said light meter.

17. In a camera, in combination, a substantially U-shaped member having a pair of spaced parallel arms and a third arm extending between and carried by said parallel arms; a light meter located between said parallel arms of said U-shaped member and having a movable indicating element which assumes positions indicative of the lighting conditions; pivot means supporting said parallel arms of said U-shaped member for turning movement about a predetermined axis; and scanning means carried by said third arm of said U-shaped member and cooperating with said indicating element of said light meter for scanning the position thereof.

18. In a camera, in combination, a substantially U-shaped member having a pair of spaced parallel arms and a third arm extending between and connected to said spaced parallel arms; a light meter located between said spaced parallel arms of said U-shaped member and having on one side a movable pointer which assumes positions indicative of the lighting conditions, said third arm of said U-shaped member being located on the same side of said meter at said pointer thereof; and pivot means located on the side of said meter opposite from said pointer thereof and pivotally supporting said spaced parallel arms for turning movement.

19. In a camera, in combination, a substantially U-shaped member having a pair of spaced parallel arms and a third arm extending between and connected to said spaced parallel arms; a light meter located between said spaced parallel arms of said U-shaped member and having on one side a movable pointer which assumes positions indicative of the lighting conditions, said third arm of said U-shaped member being located on the same side of said meter at said pointer thereof; pivot means located on the side of said meter opposite from said pointer thereof and pivotally supporting said spaced parallel arms for turning movement; scanning means carried by said third arm for scanning the position of said pointer; and a pair of supporting levers respectively located adjacent said pair of parallel spaced arms of said U-shaped member and respectively engaging said spaced parallel arms adjacent said third arm of said U-shaped member for supporting said U-shaped member.

20. In a camera, in combination, a substantially U-shaped member having a pair of spaced parallel arms and a third arm extending between and connected to said spaced parallel arms; a light meter located between said spaced parallel arms of said U-shaped member and having on one side a movable pointer which assumes positions indicative of the lighting conditions, said third arm of said U-shaped member being located on the same side of said meter at said pointer thereof; pivot means located on the side of said meter opposite from said pointer thereof and pivotally supporting said spaced parallel arms for turning movement; scanning means carried by said third arm for scanning the position of said pointer; and a pair of supporting levers respectively located adjacent said pair of parallel spaced arms of said U-shaped member and respectively engaging said spaced parallel arms adjacent said third arm of said U-shaped member for supporting said U-shaped member; and pivot means supporting said support levers for turning movement about an axis parallel to the turning axis of said spaced arms of said U-shaped member and fixing said support levers to each other for turning movement together.

21. In a camera, in combination, a substantially U-shaped member having a pair of spaced parallel arms and a third arm extending between and connected to said spaced parallel arm; a light meter located between said spaced parallel arms of said U-shaped member and having on one side a movable pointer which assumes positions indicative of the lighting conditions, said third arm of said U-shaped member being located on the same side of said meter at said pointer thereof; pivot means located on the side of said meter opposite from said pointer thereof and pivotally supporting said spaced parallel arms for turning movement; scanning means carried by said third arm for scanning the position of said pointer; and a pair of supporting levers respectively located adjacent said pair of parallel spaced arms of said U-shaped member and respectively engaging said spaced parallel arms adjacent said third arm of said U-shaped member for supporting said U-shaped member; pivot means supporting said support levers for turning movement about an axis parallel to the turning axis of said spaced arms of said U-shaped member and fixing said support levers to each other for turning movement together, said pivot means which supports said support levers and interconnects them for turning movement together being in the form of an elongated rod supported for rotary movement about its axis and extending beneath said light meter.

22. In a camera, in combination, a substantially U-shaped member having a pair of parallel spaced arms and a third arm located between and connected to said pair of spaced parallel arms; a light meter located between said pair of spaced parallel arms and having a movable pointer; scanning means carried by said third arm for scanning said pointer; pivot means supporting said spaced parallel arms for turning movement about a predetermined axis; a pair of support levers respectively located alongside of said pair of spaced parallel arms adjacent to said third arm; and a pair of pin-and-slot means interconnecting said pair of support levers with said pair of spaced parallel arms of said U-shaped member.

23. In a camera, in combination, a substantially U-shaped member having a pair of spaced parallel arms and a third arm located between and connected to said pair of spaced parallel arms; a light meter located in the space between said spaced parallel arms of said U-shaped member and having a movable pointer indicative of the lighting conditions; scanning means carried by said third arm for scanning said pointer; pivot means supporting said spaced parallel arms for turning movement about a predetermined axis; support lever means supporting at least one of said spaced parallel arms and connected thereto adjacent said third arm; and an extension fixed to said support lever means for turning movement therewith and transmitting movement thereof to a structure of the camera which determines, at least in part, the exposure made by the camera.

References Cited in the file of this patent

UNITED STATES PATENTS

| | | |
|---|---|---|
| 2,925,760 | Broschke | Feb. 23, 1960 |
| 2,940,046 | Herterich | June 7, 1960 |
| 3,000,282 | Noack | Sept. 19, 1961 |
| 3,005,390 | Hahn | Oct. 24, 1961 |